US012524702B2

(12) United States Patent
Gladding et al.

(10) Patent No.: US 12,524,702 B2
(45) Date of Patent: Jan. 13, 2026

(54) COMPUTING DOT PRODUCTS AT HARDWARE ACCELERATOR

(71) Applicant: Microsoft Technology Licensing, LLC, Redmond, WA (US)

(72) Inventors: Derek Edward Davout Gladding, Poughquag, NY (US); Nitin Naresh Garegrat, San Jose, CA (US); Viraj Sunil Khadye, Sunnyvale, CA (US); Yuxuan Zhang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1218 days.

(21) Appl. No.: 17/149,602

(22) Filed: Jan. 14, 2021

(65) Prior Publication Data

US 2022/0222575 A1    Jul. 14, 2022

(51) Int. Cl.
*G06N 20/00* (2019.01)
(52) U.S. Cl.
CPC .................... *G06N 20/00* (2019.01)
(58) Field of Classification Search
CPC    G06N 20/00; G06N 3/08; G06N 3/04; G06N 3/045; G06N 3/047; G06N 3/044; G06N 3/084; G06N 3/0455; G06N 3/0499
See application file for complete search history.

(56) References Cited

U.S. PATENT DOCUMENTS

| | | | |
|---|---|---|---|
| 8,275,822 B2 * | 9/2012 | Olofsson | G06F 7/53 708/620 |
| 9,104,474 B2 | 8/2015 | Kaul et al. | |
| 10,042,607 B2 | 8/2018 | Langhammer | |
| 10,642,614 B2 * | 5/2020 | Kaul | G06F 15/8053 |
| 2018/0322607 A1 | 11/2018 | Mellempudi et al. | |

(Continued)

FOREIGN PATENT DOCUMENTS

| CN | 111767516 A | 10/2020 |
|---|---|---|
| EP | 3713093 A1 | 9/2020 |

OTHER PUBLICATIONS

Zhang et al., New Flexible Multiple-Precision Multiply-Accumulate Unit for Deep Neural Network Training and Inference, 2019 (Year : 2019).*

(Continued)

*Primary Examiner* — Van C Mang
(74) *Attorney, Agent, or Firm* — Alleman Hall & Tuttle LLP

(57) ABSTRACT

A computing device, including a hardware accelerator configured to train a machine learning model by computing a first product matrix including a plurality of first dot products. Computing the first product matrix may include receiving a first matrix including a plurality of first vectors and a second matrix including a plurality of second vectors. Each first vector may include a first shared exponent and a plurality of first vector elements. Each second vector may include a second shared exponent and a plurality of second vector elements. For each first vector, computing the first product matrix may further include computing the first dot product of the first vector and a second vector. The first dot product may include a first dot product exponent, a first dot product sign, and a first dot product mantissa. Training the first machine learning model may further include storing the first product matrix in memory.

18 Claims, 12 Drawing Sheets

(56) References Cited

U.S. PATENT DOCUMENTS

| | | |
|---|---|---|
| 2019/0339937 A1 | 11/2019 | Lo et al. |
| 2020/0193273 A1 | 6/2020 | Chung et al. |
| 2020/0272881 A1 | 8/2020 | Lo |
| 2020/0302330 A1 | 9/2020 | Chung et al. |

OTHER PUBLICATIONS

Luo et al., Accelerating Pipelined Integer and Floating-Point Accumulations in Configurable Hardware with Delayed Addition Techniques, 2000 (Year: 2000).*

Albericio, et al., "Cnvlutin: Ineffectual-Neuron-Free Deep Neural Network Computing", In Proceedings of ACM/IEEE 43rd Annual International Symposium on Computer Architecture, Jun. 18, 2016, pp. 1-13.

Belyaev, et al., "A High-perfomance Multi-format SIMD Multiplier for Digital Signal Processors", In Proceedings of EEE Conference of Russian Young Researchers in Electrical and Electronic Engineering (EIConRus), Jan. 27, 2020, pp. 1780-1783.

Condia, et al., "FlexGripPlus: An improved GPGPU model to support reliability analysis", In Journal of Microelectronics Reliability, Jun. 1, 2020, pp. 1-14.

Kuang, et al., "A Multi-functional Multi-precision 4D Dot Product Unit with SIMD Architecture", In Arabian Journal for Science and Engineering, vol. 41, Mar. 30, 2016.

"International Search Report and Written Opinion Issued in PCT Application No. PCT/US21/061302", Mailed Date: Mar. 7, 2022, 12 Pages.

Zhang, et al., "New Flexible Multiple-Precision Multiply-Accumulate Unit for Deep Neural Network Training and Inference", In Proceedings of IEEE Transactions on Computers, vol. 69, Issue 1, J, Jan. 1, 2020, pp. 26-38.

Office Action Received for Taiwan Application No. 110146499, mailed on Oct. 28, 2025, 11 Pages (English Translation Not Provided).

* cited by examiner

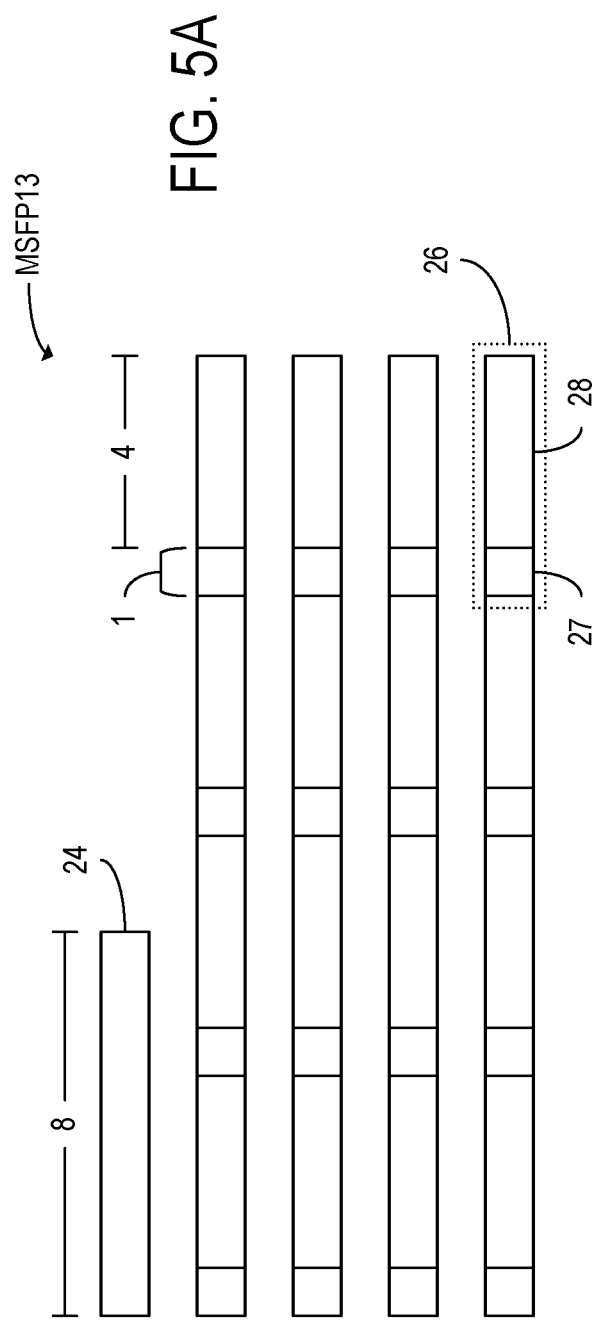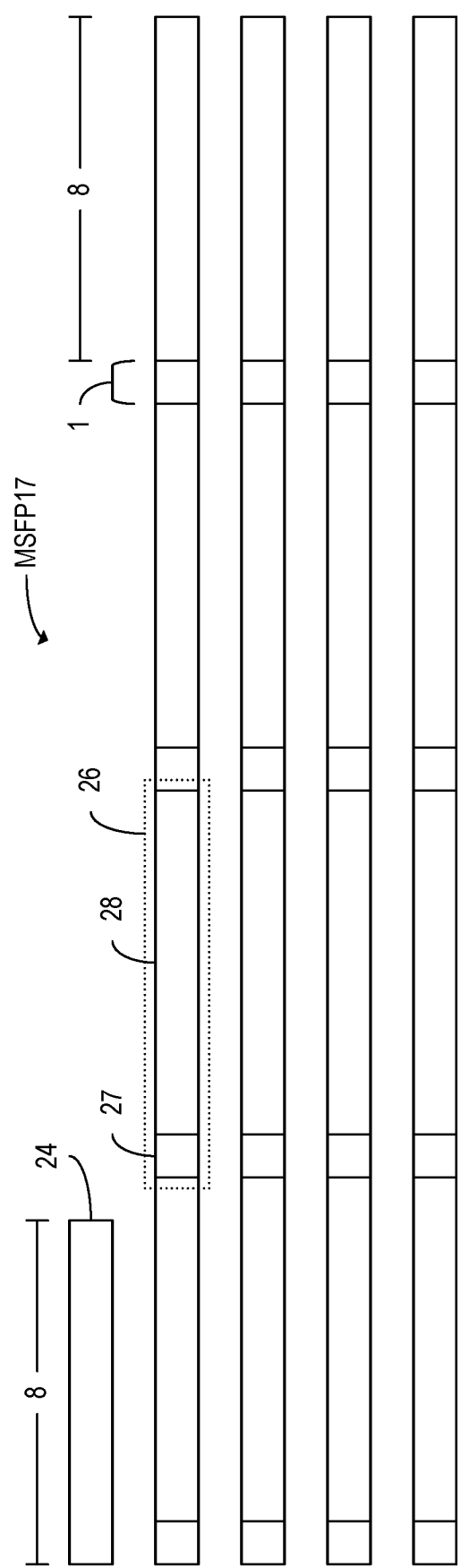

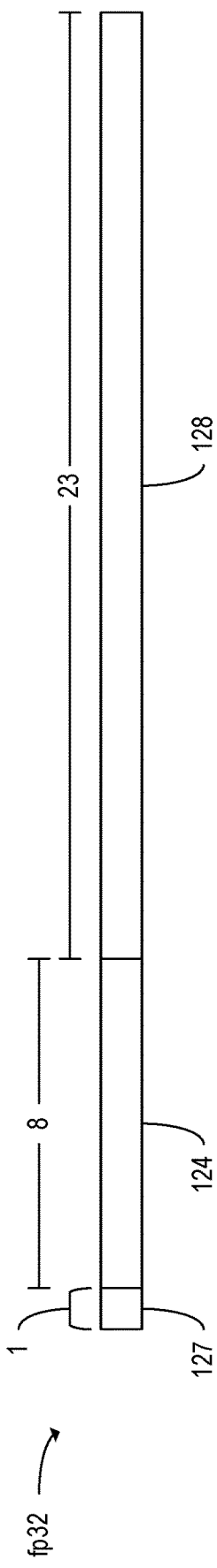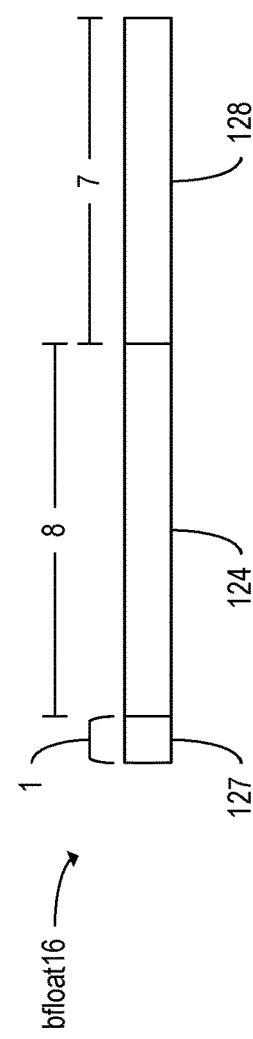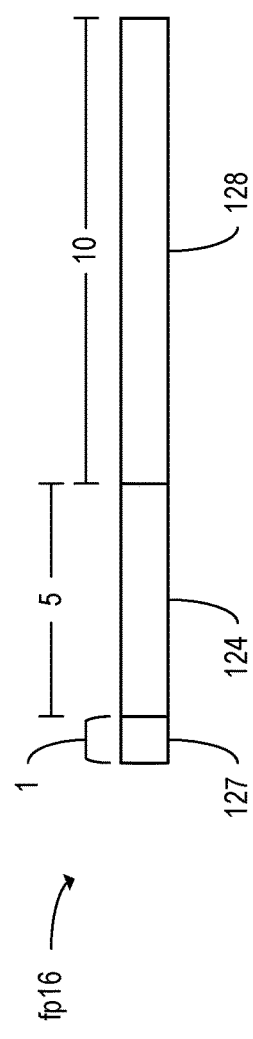

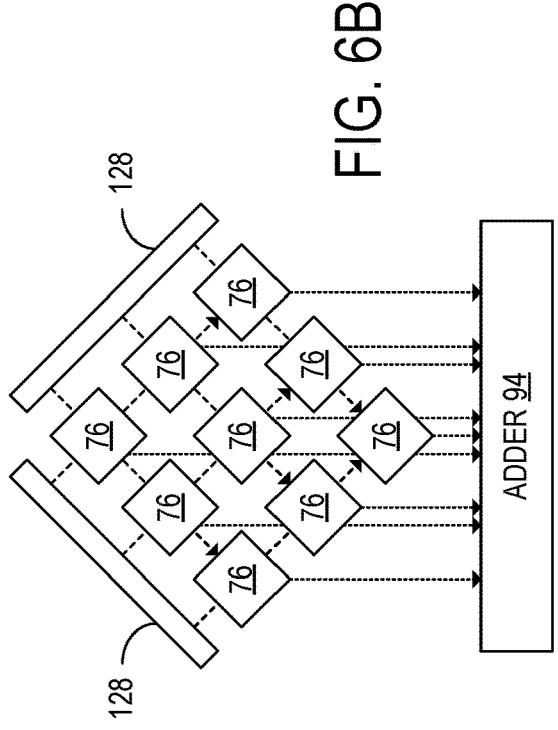
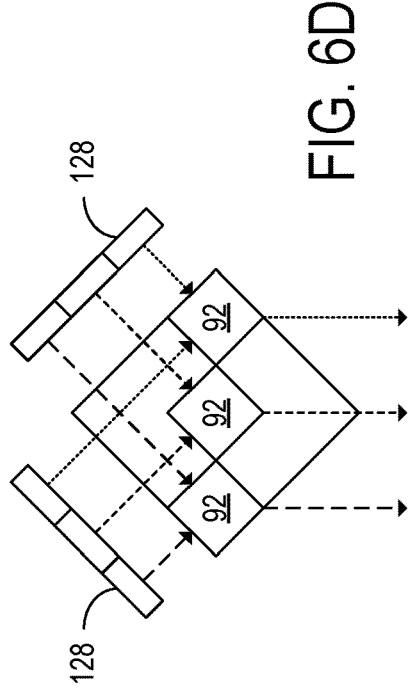
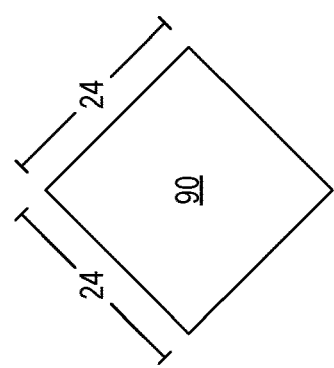
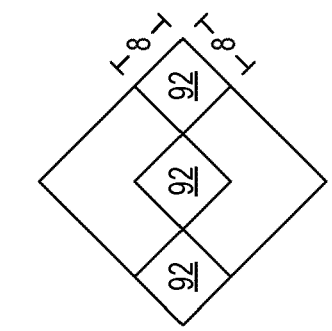
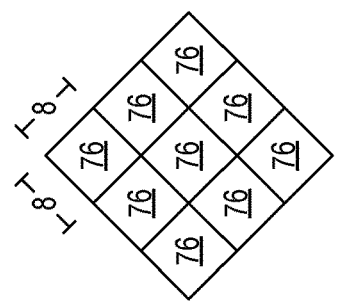
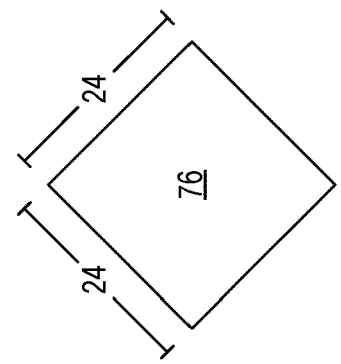
FIG. 6A
FIG. 6B
FIG. 6C
FIG. 6D

COMPUTING DOT PRODUCTS AT HARDWARE ACCELERATOR

BACKGROUND

Matrix multiplication operations are frequently performed in machine learning applications when performing training and inferencing for machine learning models. These matrix multiplication operations are frequently performed on large matrices (e.g. with tens of thousands or hundreds of thousands of rows and columns), and may be very computationally resource-intensive in terms of both memory and processor utilization.

SUMMARY

According to one aspect of the present disclosure, a computing device is provided, including a hardware accelerator configured to train a machine learning model at least in part by computing a first product matrix including a plurality of first dot products. Computing the first product matrix may include receiving a first matrix including a plurality of first vectors and a second matrix including a plurality of second vectors. Each first vector of the plurality of first vectors may include a first shared exponent and a plurality of first vector elements. Each second vector of the plurality of second vectors may include a second shared exponent and a plurality of second vector elements. For each first vector of the plurality of first vectors, computing the first product matrix may further include computing the first dot product of the first vector and a second vector of the plurality of second vectors. The first dot product may include a first dot product exponent, a first dot product sign, and a first dot product mantissa. Training the first machine learning model may further include storing the first product matrix in memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A-5B show example shared-exponent data types in which vectors may be expressed, according to the example of FIG. 1A.

FIGS. 5C-5E show example unshared-exponent data types in which vector elements may be expressed, according to the example of FIG. 3.

FIG. 6A shows an example plurality of multiplier blocks that are combined into a multiplier super-block, according to the example of FIG. 1B.

FIG. 6B shows example data flow paths through the multiplier blocks of FIG. 6A when the multiplier blocks are combined into the multiplier super-block.

FIG. 6C shows an example multiplier block that is divided into a plurality of multiplier sub-blocks, according to the example of FIG. 1B.

FIG. 6D shows example data flow paths through the multiplier block of FIG. 6C when the multiplier block is divided into a plurality of multiplier sub-blocks.

DETAILED DESCRIPTION

Figure 1A:
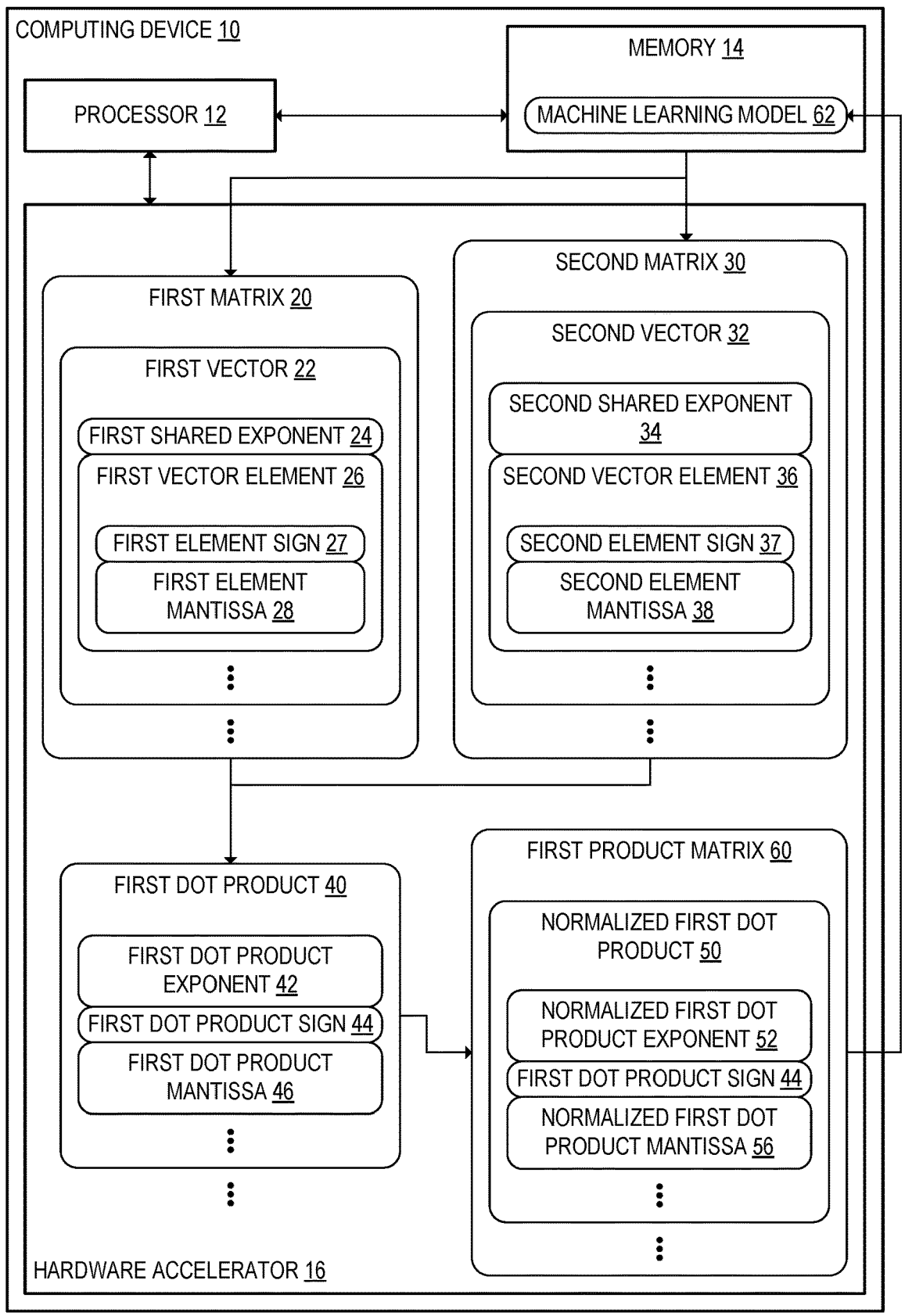
FIG. 1A schematically depicts a computing device including a hardware accelerator configured to train a machine learning model at least in part by computing a first product matrix, according to one example embodiment.

In order to perform matrix multiplication more efficiently when training machine learning models, the following systems and methods are provided. FIG. 1A schematically depicts a computing device 10, according to one example embodiment. The computing device 10 may include a processor 12, memory 14, and a hardware accelerator 16. The processor 12 may be a general-purpose processor, while the hardware accelerator 16 may be specialized for performing a subset of computing tasks. The hardware accelerator 16 may be configured to perform the subset of computing tasks more efficiently than the processor 12, and the processor 12 may be configured to offload such computing tasks to the hardware accelerator 16. The hardware accelerator 16 may be specialized for performing matrix multiplication. The memory 14 included in the computing device 10 may include volatile memory and/or non-volatile memory. The memory 14 may be communicatively coupled to the processor 12 and the hardware accelerator 16 such that the processor 12 and the hardware accelerator 16 may store data in the memory 14 and retrieve data from the memory 14.

In some examples, the functionality of the computing device 10 may be distributed between a plurality of networked physical computing devices rather than being provided in a single physical computing device. For example, the computing device 10 may be instantiated in a data center, and one or more components of the computing device 10 may be provided in a plurality of physical computing devices that are located in the data center and connected via a network. The physical computing devices located in the data center may be configured to communicate with one or more client computing devices which may be located outside the data center and which may also at least partially instantiate one or more of the components of the computing device 10.

As shown in the example of FIG. 1A, the memory 14 of the computing device 10 may store a machine learning model 62. The machine learning model 62 may include one or more matrices that encode properties of the machine learning model 62. For example, the one or more matrices may be matrices of neuronal weights or biases. At the processor 12, the computing device 10 may be configured to receive instructions to train the machine learning model 62 at least in part by performing a matrix multiplication operation on the one or more matrices included in the machine learning model 62. For example, the instructions may be instructions to perform an iteration of gradient descent on the neuronal weights of a deep neural network, generate a sample at a generator of a generative adversarial network, or perform some other operation by which the machine learning model 62 may be trained. The processor 12 may be further configured to offload a matrix multiplication operation to the hardware accelerator 16, as discussed above. Thus, the computing device 10 may be configured to train the machine learning model 62 at least in part at the hardware accelerator 16.

The hardware accelerator 16 may be configured to train the machine learning model 62 at least in part by computing a first product matrix 60. The first product matrix 60 may include a plurality of first dot products 40, which may be the dot products of a plurality of first vectors 22 included in a first matrix 20 and a plurality of second vectors 32 included in a second matrix 30. In some examples, as discussed in further detail below, the plurality of first dot products may be included in the first product matrix 60 in the form of a plurality of normalized first dot products 50 on which an exponent normalization operation has been performed. After the first product matrix 60 has been generated, the hardware accelerator 16 may be further configured to store the first product matrix 60 in the memory 14. Thus, the machine learning model 62 stored in the memory 14 may be updated by computing the first product matrix 60. It will be appreciated that other tasks that utilize matrix multiplication may also be performed, outside of the machine learning field.

Figure 1B:
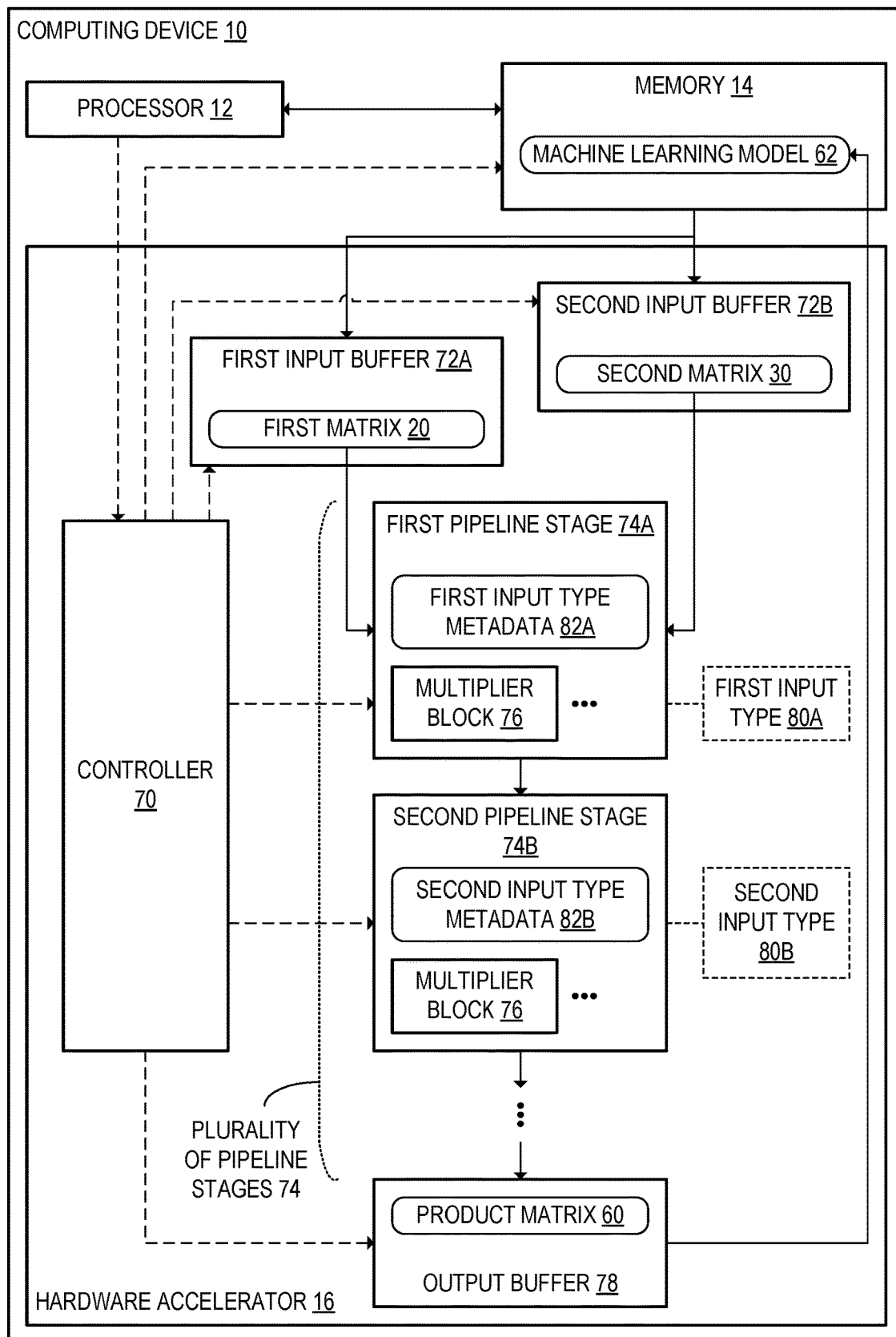
FIG. 1B schematically shows the example computing device of claim 1A in an example in which the hardware accelerator includes a plurality of pipeline stages.

FIG. 1B schematically shows the components of the hardware accelerator 16 included in the computing device 10, according to one example. The hardware accelerator 16 may include a controller 70 at which the hardware accelerator 16 may be configured to receive instructions from the processor 12. In addition, the controller 70 may be further configured to transmit control instructions to other components of the hardware accelerator 16 and to the memory 14. For example, the controller 70 may be configured to transmit direct memory access (DMA) requests to the memory 14 that instruct a DMA controller included in the memory 14 to read data into the hardware accelerator 16. As another example, the controller 70 may be configured to transmit instructions to an output buffer 78 of the hardware accelerator 16 in which the first product matrix 60 is stored. The instructions transmitted to the output buffer 78 may be instructions to transfer the first product matrix 60 to the memory 14.

As shown in the example of FIG. 1B, the hardware accelerator 16 may further include a first input buffer 72A and a second input buffer 72B. Computing the first product matrix 60 at the hardware accelerator 16 may include receiving a first matrix 20 including a plurality of first vectors 22 and a second matrix 30 including a plurality of second vectors 32, as discussed above. The first matrix 20 may be received at the first input buffer 72A, and the second matrix 30 may be received at the second input buffer 72B.

Returning to FIG. 1A, each first vector 22 of the plurality of first vectors 22 may include a first shared exponent 24 and a plurality of first vector elements 26. The first shared exponent 24 may be associated with all the first vector elements 26 included in the first vector 22. Alternatively, as discussed below, the first shared exponent 24 may be associated with a subset of the plurality of first vector elements 26. Each first vector element 26 of the plurality of first vector elements 26 may include a respective first element sign 27 (which may be positive or negative) and a respective first element mantissa 28. The $i^{th}$ value $u_i$ included in the first vector 22 may be given by $$u_i = 2^{x_1} s_i m_i$$

where $x_1$ is the first shared exponent 24, $s_i$ is the first element sign 27 of the $i^{th}$ first vector element 26, and $m_i$ is the first element mantissa 28 of the $i^{th}$ first vector element 26.

Similarly, each second vector 32 of the plurality of second vectors 32 may include a second shared exponent 34 and a plurality of second vector elements 36. The second shared exponent 34 may be associated with all the second vector elements 36 included in the second vector 32. Alternatively, the second shared exponent 34 may be associated with a subset of the plurality of second vector elements 36. Each second vector element 36 of the plurality of second vector elements 36 may include a respective second element sign 37 and a respective second element mantissa 38. The $j^{th}$ value $v_j$ included in the second vector 32 may be given by $$v_j = 2^{x_2} t_j n_j$$

where $x_2$ is the second shared exponent 34, $t_j$ is the second element sign 37 of the $j^{th}$ second vector element 36, and $n_j$ is the second element mantissa 38 of the $j^{th}$ second vector element 36.

In some examples, the first vector 22 may include a plurality of first shared exponents 24 that are each associated with a plurality of first vector elements 26, and the second vector 32 may include a plurality of second shared exponents 34 that are each associated with a plurality of second vector elements 36. The first vector 22 may include a plurality of first shared exponents 24 and the second vector 32 may include a plurality of second shared exponents 34 when a data type that is used to express the shared exponents and their associated vector elements is shorter than the length in bits of the first vector 22 and the second vector 32. For example, the respective lengths of the first vector 22 and the second vector 32 in bits may be integer multiples of the length of the data type in bits. In such examples, the first vector 22 and the second vector 32 may each include a respective number of shared exponents equal to that integer.

For each first vector 22 of the plurality of first vectors 22, computing the first product matrix 60 at the hardware accelerator 16 may further include computing the first dot product 40 of the first vector 22 and a second vector 32 of the plurality of second vectors 32. The first dot product 40 may be computed as $$p = \sum_i u_i v_i$$

where p is the first dot product 40 and $u_i$ and $v_i$ are defined as shown above. The first dot product 40 may include a first dot product exponent 42, a first dot product sign 44, and a first dot product mantissa 46.

In some examples, computing the first product matrix 60 at the hardware accelerator 16 may further include performing an exponent normalization operation on the first dot product 40 to obtain a normalized first dot product 50. The exponent normalization operation may be an operation in which one or more leading zeroes are removed from the first dot product exponent 42 to obtain a normalized first dot product exponent 52. Thus, the normalized first dot product may include the normalized first dot product exponent 52, the first dot product sign 44 and a normalized first dot product mantissa 56. As shown in the example of FIG. 1A, the first product matrix 60 may include a plurality of normalized first dot products 50 that are computed for the plurality of first vectors 22 and the plurality of second vectors 32.

Figure 2:
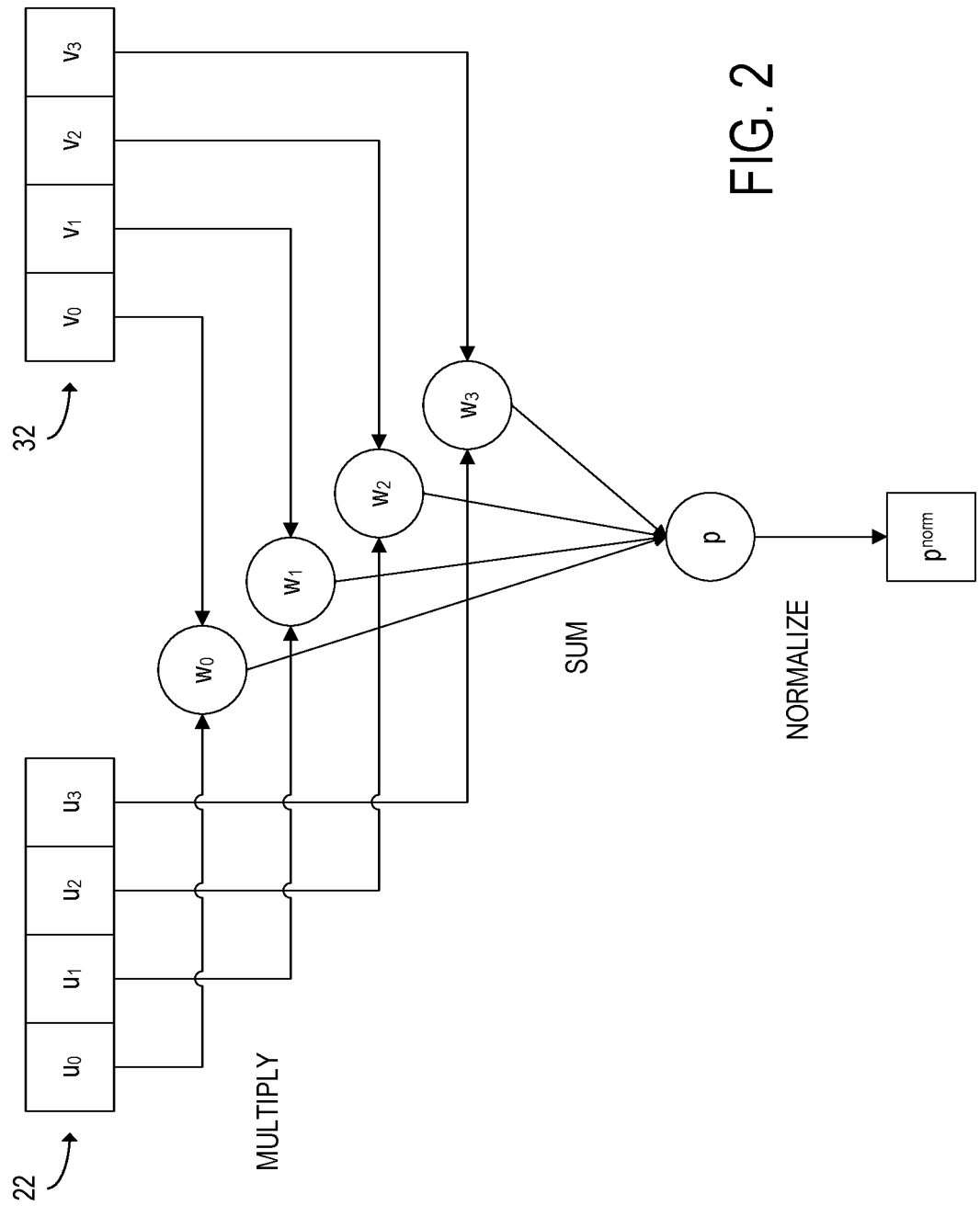
FIG. 2 schematically shows an example computation of a normalized first dot product at the hardware accelerator, according to the example of FIG. 1A.

FIG. 2 shows an example computation of a normalized first dot product $p^{norm}$ at the hardware accelerator 16. In the example of FIG. 2, the first vector 20 includes four values $u_i$ and the second vector includes four values $v_j$. The hardware accelerator 16 may be configured to compute a plurality of intermediate products $w_i$ by multiplying the values $u_i$ by the corresponding values $v_j$ for which i=j. The hardware accelerator 16 may be further configured to sum the plurality of intermediate products $w_i$ to obtain the first dot product p, to which the hardware accelerator 16 may be further configured to apply the exponent normalization operation to compute the normalized first dot product $p^{norm}$.

Figure 3:
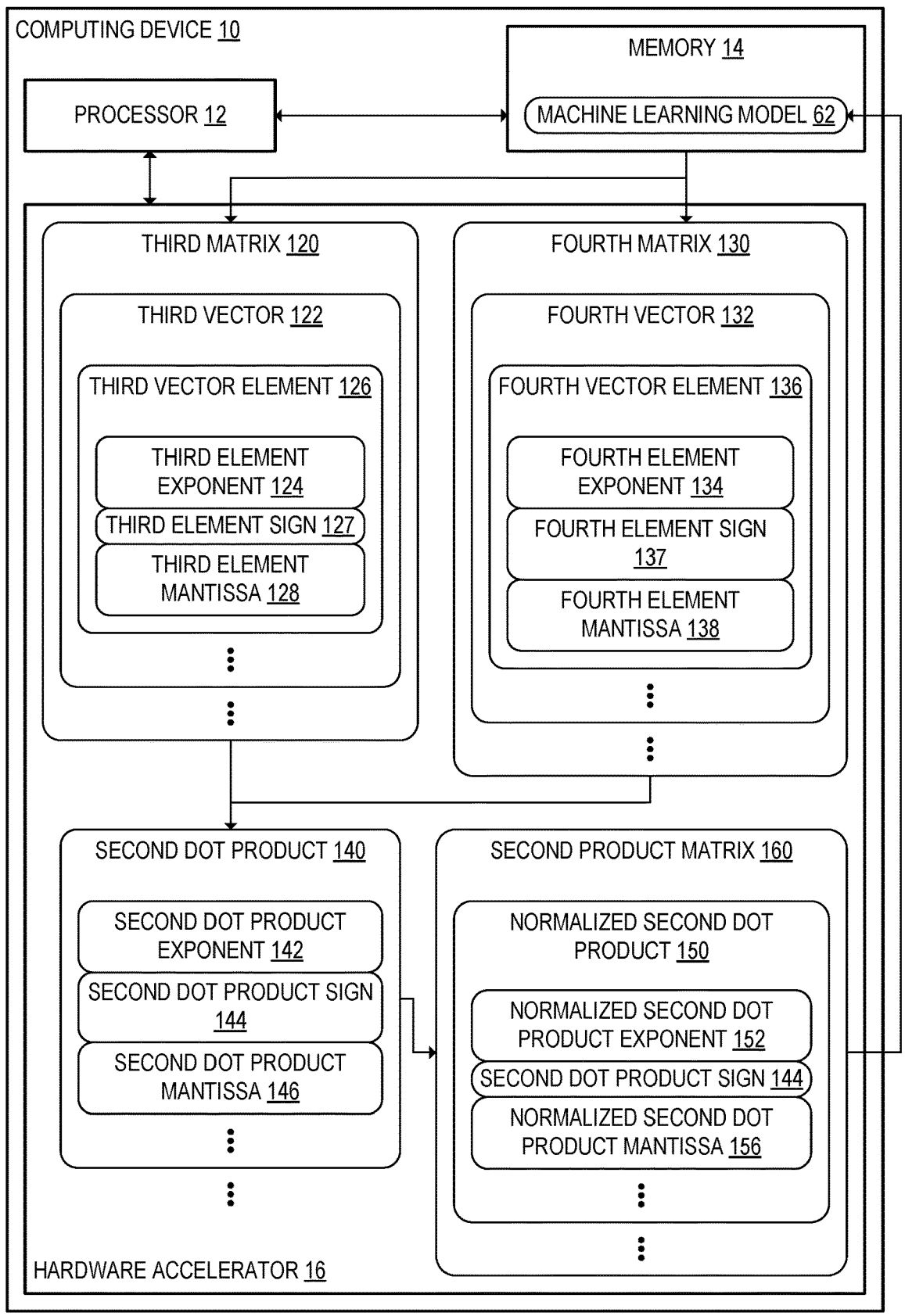
FIG. 3 schematically shows the example computing device of FIG. 1A when the hardware accelerator is reconfigured to compute a second product matrix.

Turning now to FIG. 3, the hardware accelerator 16 may be reconfigurable to compute a second product matrix 160 including a plurality of second dot products 140. FIG. 3 shows the example computing device 10 of FIG. 1A when the hardware accelerator 16 is reconfigured to compute the second product matrix 160. Computing the second product matrix 160 may include receiving, at the hardware accelerator 16, a third matrix 120 including a plurality of third vectors 122 and a fourth matrix 130 including a plurality of fourth vectors 132. The third matrix 120 and the fourth matrix 130 may be received at the first input buffer 72A and the second input buffer 72B, respectively.

Each third vector 122 of the plurality of third vectors 122 may include a plurality of third vector elements 126. The plurality of third vector elements 126 may each include a respective third element exponent 124, a respective third element sign 127, and a respective third element mantissa 128. Similarly, each fourth vector 132 of the plurality of fourth vectors 132 may include a plurality of fourth vector elements 136. The plurality of fourth vector elements 136 may each include a respective fourth element exponent 134, a respective fourth element sign 137, and a respective fourth element mantissa 138. Thus, rather than including shared exponents, each third vector 122 and each fourth vector 132 may include a respective exponent in each element.

Computing the second product matrix 160 may further include, for each third vector 122 of the plurality of third vectors 122, computing the second dot product 140 of the third vector 122 and a fourth vector 132 of the plurality of fourth vectors 132. The second dot product 140 may include a second dot product exponent 142, a second dot product sign 144, and a second dot product mantissa 146. In some examples, the hardware accelerator 16 may be further configured to perform the exponent normalization operation on the second dot product 140 to remove one or more leading zeroes. Thus, the hardware accelerator 16 may be configured to compute a normalized second dot product 150 that includes a normalized second dot product exponent 152, the second dot product sign 144, and a normalized second dot product mantissa 156. In such examples, the normalized second dot product 150 may be included in the second product matrix 160, as shown in the example of FIG. 3.

Figure 4:
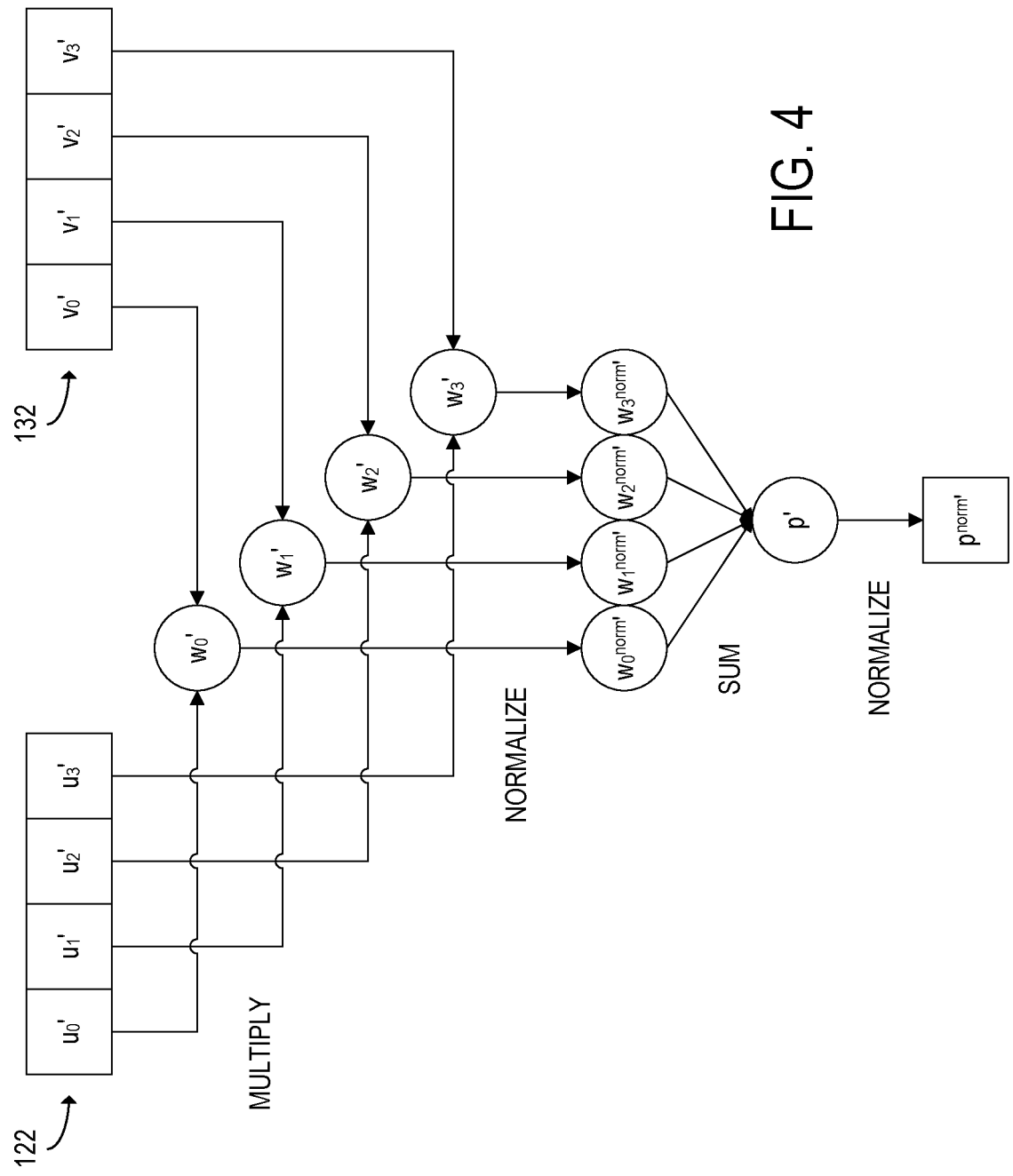
FIG. 4 schematically shows an example computation of a normalized second dot product at the hardware accelerator when the hardware accelerator has been reconfigured as shown in the example of FIG. 3.

FIG. 4 shows an example computation of a normalized second dot product $p^{norm'}$ at the hardware accelerator 16. In the example of FIG. 4, the third vector 122 includes a plurality of third vector elements $u_i'$ and the fourth vector 132 includes a plurality of fourth vector elements $v_j'$. The third vector elements $u_i'$ may be multiplied by the corresponding fourth vector elements $v_j'$ for which i=j to compute a plurality of intermediate products $w_i'$. The hardware accelerator 16 may be further configured to perform the exponent normalization operation on each of the intermediate products $w_i'$ to compute a plurality of normalized intermediate products $w_i^{norm'}$. The hardware accelerator 16 may be further configured to sum the plurality of normalized intermediate products $w_i^{norm'}$ to obtain a second dot product p', and perform the exponent normalization operation on the second dot product p' to compute the normalized second dot product $p^{norm'}$.

Relative to the computation of the normalized first dot product 50 as shown in FIG. 2, an additional exponent normalization operation is performed for each intermediate product $w_i'$ in the computation of the normalized second dot product 150 as shown in FIG. 4. The additional exponent normalization operations may be avoided in the example of FIG. 2 as a result of assigning shared exponents to the first vector 22 and the second vector 32, since each of the intermediate products $w_i$ in the example of FIG. 2 has the same exponent. However, assigning individual exponents to the third vector elements 126 and the fourth vector elements 136 as shown in FIG. 3 may allow some of the third vector elements 126 and the fourth vector elements 136 to be expressed with higher precision when the third vector 122 or the fourth vector 132 includes two or more elements having different exponents. Thus, it may be desirable to switch between a shared-exponent data type and an unshared-exponent data type based on the ranges of the values included in the input matrices.

Returning to FIG. 1B, the hardware accelerator 16 may include a plurality of pipeline stages 74. The plurality of pipeline stages 74 may each include one or more corresponding matrix multiplier blocks 76. In some examples, data may be passed through the plurality of pipeline stages 74 serially, and each pipeline stage 74 may include a plurality of multiplier blocks 76 arranged in parallel. The hardware accelerator 16 may be configured to compute a corresponding plurality of product matrices at the matrix multiplier blocks 76 of the plurality of pipeline stages 74. The plurality of product matrices may include the first product matrix 60 and the second product matrix 160.

In examples in which the hardware accelerator 16 includes a plurality of pipeline stages 74, two or more pipeline stages 74 of the plurality of pipeline stages 74 may be configured to receive respective inputs having different respective input types. In the example of FIG. 1B, the hardware accelerator 16 includes a first pipeline stage 74A that is configured to receive inputs with a first input type 80A. The hardware accelerator 16 of FIG. 1B also includes a second pipeline stage 74B that is configured to receive inputs with a second input type 80B. In some examples, one of the first input type 80A and the second input type 80B may be a shared-exponent data type, and the other may be an unshared-exponent data type.

In examples in which two or more pipeline stages 74 of the plurality of pipeline stages 74 are configured to receive inputs with different respective input types, the inputs received at the two or more pipeline stages 74 may include respective input type metadata indicating the respective input types of the inputs. In the example of FIG. 1B, the first pipeline stage 74A is configured to receive first input type metadata 82A and the second pipeline stage 74B is configured to receive second input type metadata 82B. Each pipeline stage 74 of the plurality of pipeline stages 74 may be configured to receive respective input type metadata. The first input type metadata 82A and the second input type metadata 82B may, for example, be provided as headers of the first matrix 20 and the second matrix 30. Alternatively, the first input type metadata 82A and the second input type metadata 82B may be provided as headers of the plurality of first vectors 22 and the plurality of second vectors 32.

When a pipeline stage 74 receives input, the hardware accelerator 16 may be configured to reconfigure the pipeline stage 74 based on the input type metadata included in that input. For example, when the input type metadata indicates that the input has an unshared-exponent data type but the pipeline stage 74 is currently configured to process vectors having a shared-exponent data type, the hardware accelerator 16 may be further configured to reconfigure the pipeline stage 74 to process data having the unshared-exponent data type. Similarly, when the input type metadata indicates that the input has a shared-exponent data type but the pipeline stage 74 is currently configured to process vectors having an unshared-exponent data type, the hardware accelerator 16 may be further configured to reconfigure the pipeline stage 74 to process data having the shared-exponent data type.

FIGS. 5A-5B respectively show two example shared-exponent data types, MSFP13 and MSFP17, in which the plurality of first vectors 22 and the plurality of second vectors 32 may be expressed. In the MSFP13 format shown in FIG. 5A, the first shared exponent 24 may have a length of eight bits. The first vector 22 may include sixteen first vector elements 26, each of which may include a first element sign 27 with a length of one bit and a first element mantissa 28 with a length of four bits. In the MSFP17 format shown in FIG. 5B, the first shared exponent 24 may have a length of eight bits. The first vector 22 may include sixteen first vector elements 26, each of which may include a first element sign 27 with a length of one bit and a first element mantissa 28 with a length of eight bits. Although FIGS. 5A-5B show the first vector 22 in the MSFP13 and MSFP17 formats respectively, the MSFP13 and MSFP17 formats may also be used for the second vector 32.

FIGS. 5C-5E respectively show three unshared-exponent data types, fp32, bfloat16, and fp16. In the fp32 format shown in FIG. 5C, the third element sign 127 has a length of one bit, the third element exponent 124 has a length of eight bits, and the third element mantissa 128 has a length of 23 bits (24 bits when the hidden bit is included). In the bfloat16 format shown in FIG. 5D, the third element sign 127 has a length of one bit, the third element exponent 124 has a length of eight bits, and the third element mantissa 128 has a length of seven bits. In the fp16 format shown in FIG. 5E, the third element sign 127 has a length of one bit, the third element exponent 124 has a length of five bits, and the third element mantissa 128 has a length of ten bits. Although FIGS. 5C-5E show the third vector 122 in the fp32, bfloat16, and fp16 formats respectively, the fp32, bfloat16, and fp16 formats may also be used for the fourth vector 132.

In examples in which the hardware accelerator 16 is reconfigured to process vectors that have an unshared-exponent data type, each first vector element 26 of the plurality of first vector elements 26 and each second vector element 36 of the plurality of second vector elements 36 may include a respective mantissa having a first mantissa length. In addition, each third vector element 126 of the plurality of third vector elements 126 and each fourth vector element 136 of the plurality of fourth vector elements 136 may include a respective mantissa having a second mantissa length that differs from the first mantissa length. For example, a pipeline stage 74 of the hardware accelerator 16 may be reconfigured from a configuration in which it receives first vectors 22 and second vectors 32 in the MSFP17 format to a configuration in which it receives third vectors 122 and fourth vectors 132 in the fp32 format. Thus, the first mantissa length is eight bits, and the second mantissa length is 23 bits (24 bits when the hidden bit is included).

When the first mantissa length differs from the second mantissa length, the second mantissa length may be an integer multiple of the first mantissa length. In some examples, the hardware accelerator 16 may be further configured to add one or more leading zeroes to each first element mantissa 28 and each second element mantissa 38 or to each third element mantissa 128 and each fourth element mantissa 138 such that the second mantissa length is equal to an integer multiple of the first mantissa length. In the above example, a leading zero may be added to each of the third element mantissas 128 and each of the fourth element mantissas 138 such that the second mantissa length is equal to three times the first mantissa length.

The plurality of first dot products 40 and the plurality of second dot products 140 may be computed at a plurality of multiplier blocks 76 included in the hardware accelerator 16, as discussed above with reference to FIG. 1B. In examples in which the second mantissa length is an integer multiple of the first mantissa length, the hardware accelerator 16 may be further configured to reconfigure the plurality of multiplier blocks 76 to receive the plurality of third vectors 122 and the plurality of fourth vectors 132 at least in part by combining the plurality of multiplier blocks 76 into a multiplier super-block 90 at which the plurality of second dot products 140 may be computed, as shown in the example of FIG. 6A. In the example of FIG. 6A, nine 8×8 multiplier blocks 76 are combined into a 24×24 multiplier super-block 90. The nine multiplier blocks 76 shown in FIG. 6A may be included in the same pipeline stage 74. Combining the plurality of multiplier blocks 76 into the multiplier super-block 90 may include multiplexing over the outputs of the multiplier blocks 76. FIG. 6B shows the flow of data through the multiplier blocks 76 when the multiplier blocks 76 are combined into the multiplier super-block 90 of FIG. 6A. The outputs of the multiplier blocks 76 may each be transmitted to an adder 94 configured to compute the second dot product 140 as the sum of the outputs of the multiplier blocks 76.

In other examples, the first mantissa length may be an integer multiple of the second mantissa length. In such examples, as shown in FIG. 6C, the hardware accelerator 16 may be further configured to reconfigure a multiplier block 76 to receive the plurality of third vectors 122 and the plurality of fourth vectors 132 at least in part by dividing the multiplier block 76 into a plurality of multiplier sub-blocks 92 at which the plurality of second dot products 140 may be computed. In the example of FIG. 6C, the multiplier block the plurality of first dot products 40 and the plurality of second dot products 140 are computed is a 24×24 multiplier block 76, and the multiplier sub-blocks 92 are each 8×8 multiplier sub-blocks 92. Three multiplier sub-blocks 92 are formed from the multiplier block 76. FIG. 6D shows the flow of data through the multiplier block 76 when the multiplier block 76 of FIG. 6C is divided into the plurality of multiplier sub-blocks 92.

Figure 7:
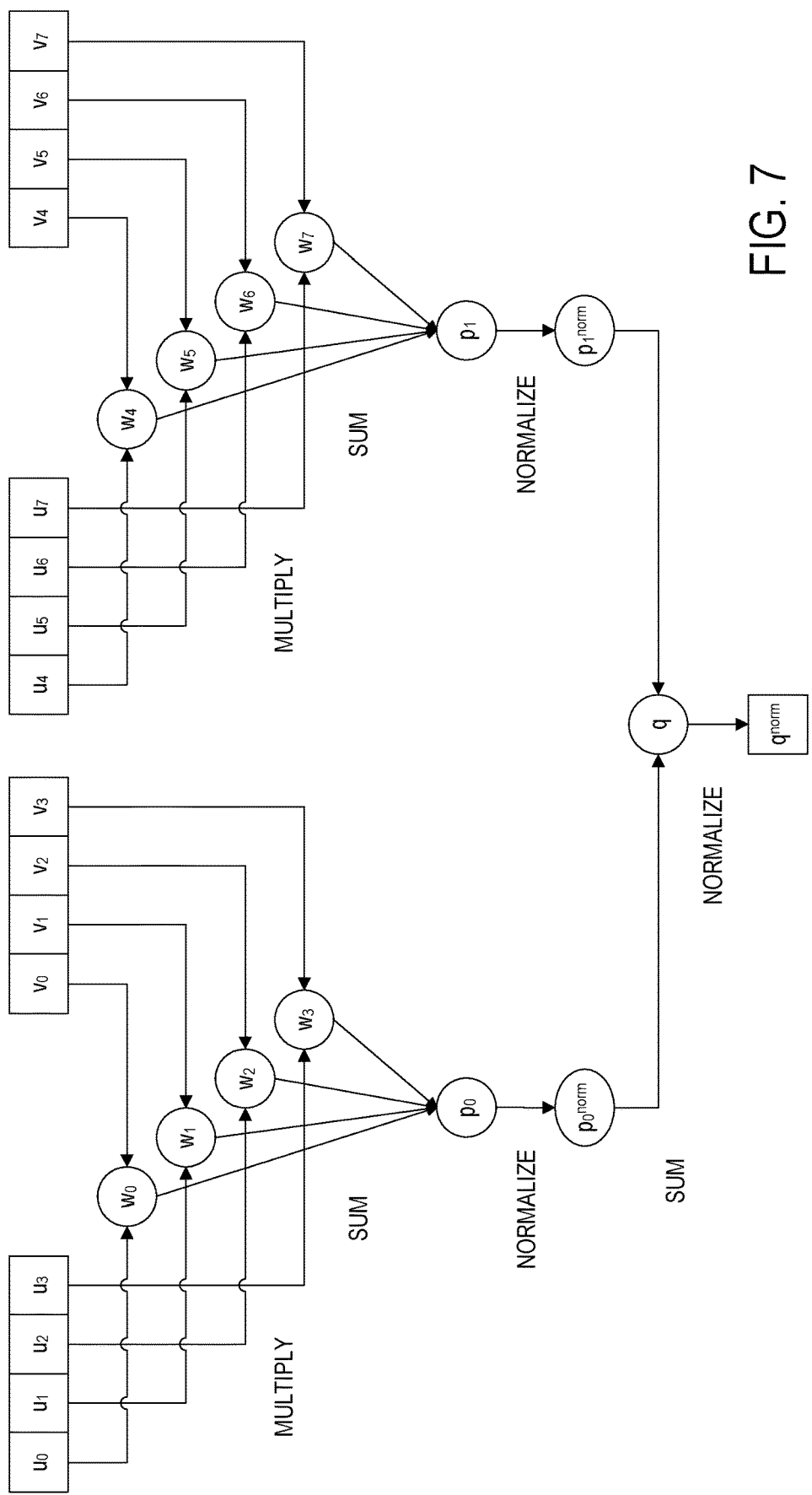
FIG. 7 schematically shows an example computation of a dot product of two vectors that each include two shared exponents, according to the example of FIG. 1A.

In some examples, computing the first product matrix 60 at the hardware accelerator 16 may further include adding the first dot product 40 to an additional dot product to obtain a dot product sum. FIG. 7 shows an example computation of a dot product sum q and a normalized dot product sum $q^{norm}$. The dot product sum computed in FIG. 7 may be the dot product of two vectors that each include two shared exponents. In the example computation of FIG. 7, the hardware accelerator 16 is configured to compute the dot product sum q as a sum of the respective normalized dot products $p_0^{norm}$ and $p_1^{norm}$ of two pairs of four-element vectors. The hardware accelerator 16 is further configured to perform the exponent normalization operation on the dot product sum q to obtain a normalized dot product sum $q^{norm}$. In the example of FIG. 7, the pairs of vectors that are taken as inputs may be sub-vectors of a pair of longer vectors that are divided such that the dot products of the sub-vectors may be computed in parallel and added together to obtain the dot product of the pair of vectors. Thus, the hardware accelerator 16 may compute the dot product of the pair of vectors with greater parallelization, at the cost of performing additional exponent normalization operations on the dot products $p_0$ and $p_1$ of the sub-vectors.

Figure 8A:
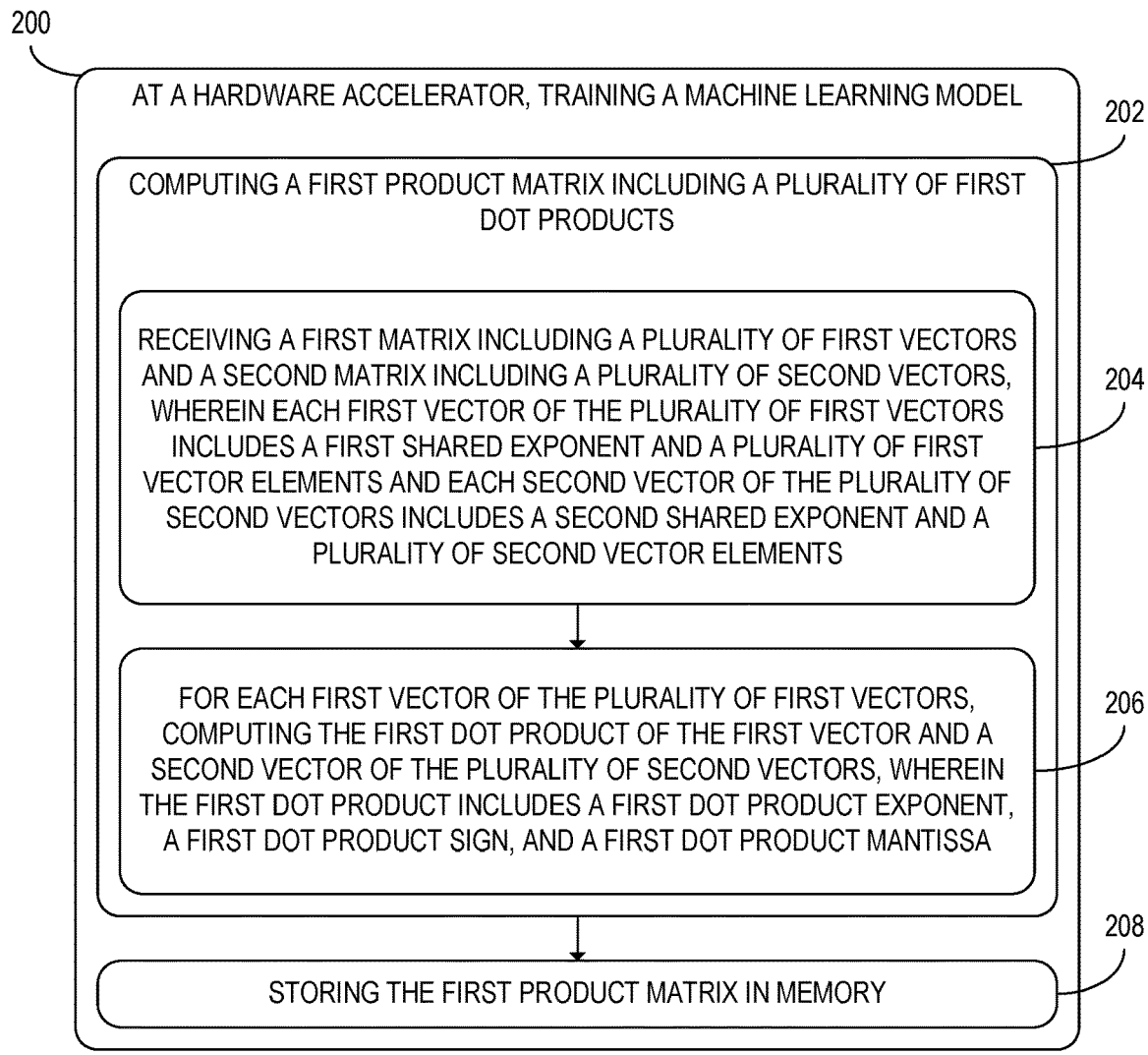
FIG. 8A shows a flowchart of an example method for use with a computing device to train a machine learning model, according to the example of FIG. 1A.

Turning now to FIG. 8A, a flowchart of an example method 200 for use with a computing device is provided. The example method 200 shown in FIG. 8A is a method of training a machine learning model at a hardware accelerator included in the computing device. The computing device may be the computing device 10 of FIG. 1A or may alternatively be some other computing device.

At step 202, the method 200 may include computing a first product matrix including a plurality of first dot products. Computing the first product matrix at step 202 may include, at step 204, receiving a first matrix including a plurality of first vectors and a second matrix including a plurality of second vectors. The first matrix and the second matrix may be respectively received at a first input buffer and a second input buffer included in the hardware accelerator. Each first vector of the plurality of first vectors may include a first shared exponent and a plurality of first vector elements, and each second vector of the plurality of second vectors may include a second shared exponent and a plurality of second vector elements. Each first vector element of the plurality of first vector elements may include a respective first element sign and a respective first element mantissa, and each second vector element of the plurality of second vector elements may include a respective second element sign and a respective second element mantissa.

At step 206, step 202 may further include, for each first vector of the plurality of first vectors, computing the first dot product of the first vector and a second vector of the plurality of second vectors. The plurality of first dot products may be computed at a plurality of multiplier blocks included in one or more pipeline stages of the hardware accelerator. The first dot product may include a first dot product exponent, a first dot product sign, and a first dot product mantissa. In some examples, the plurality of first dot products may be the elements of the first product matrix. Alternatively, one or more additional operations may be performed on the plurality of first dot products when the first product matrix is computed.

At step 208, step 202 may further include storing the first product matrix in memory. The first product matrix may be transferred from an output buffer of the hardware accelerator to memory included in the computing device outside the hardware accelerator. This memory may be volatile or non-volatile memory.

Figure 8B:
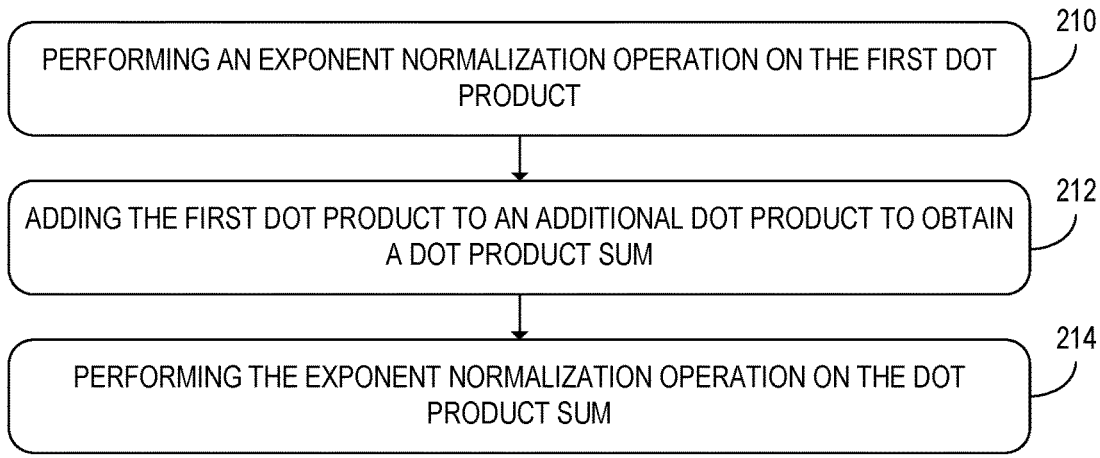
FIGS. 8B-8C show additional steps of the method of FIG. 8A that may be performed in some examples.

FIG. 8B shows additional steps of the method 200 that may be performed in examples in which, for each of the plurality of first dot products, one or more additional operations are performed when computing the elements of the first product matrix. At step 210, computing the first product matrix at step 202 may further include, for each of the plurality of first dot products, performing an exponent normalization operation on the first dot product. Thus, the hardware accelerator may compute a plurality of normalized first dot products, which may be the elements of the first product matrix in some examples. In some examples, at step 212, the method 200 may further include adding the first dot product to an additional dot product to obtain a dot product sum. In such examples, the first dot product and the additional dot product may be sub-vectors of a larger vector. Computing the dot product of that larger vector with an additional vector may be parallelized by computing and summing the dot products of respective sub-vectors of those vectors. In examples in which step 210 is performed, the method 200 may further include, at step 214, performing the exponent normalization operation on the dot product sum.

Figure 8C:
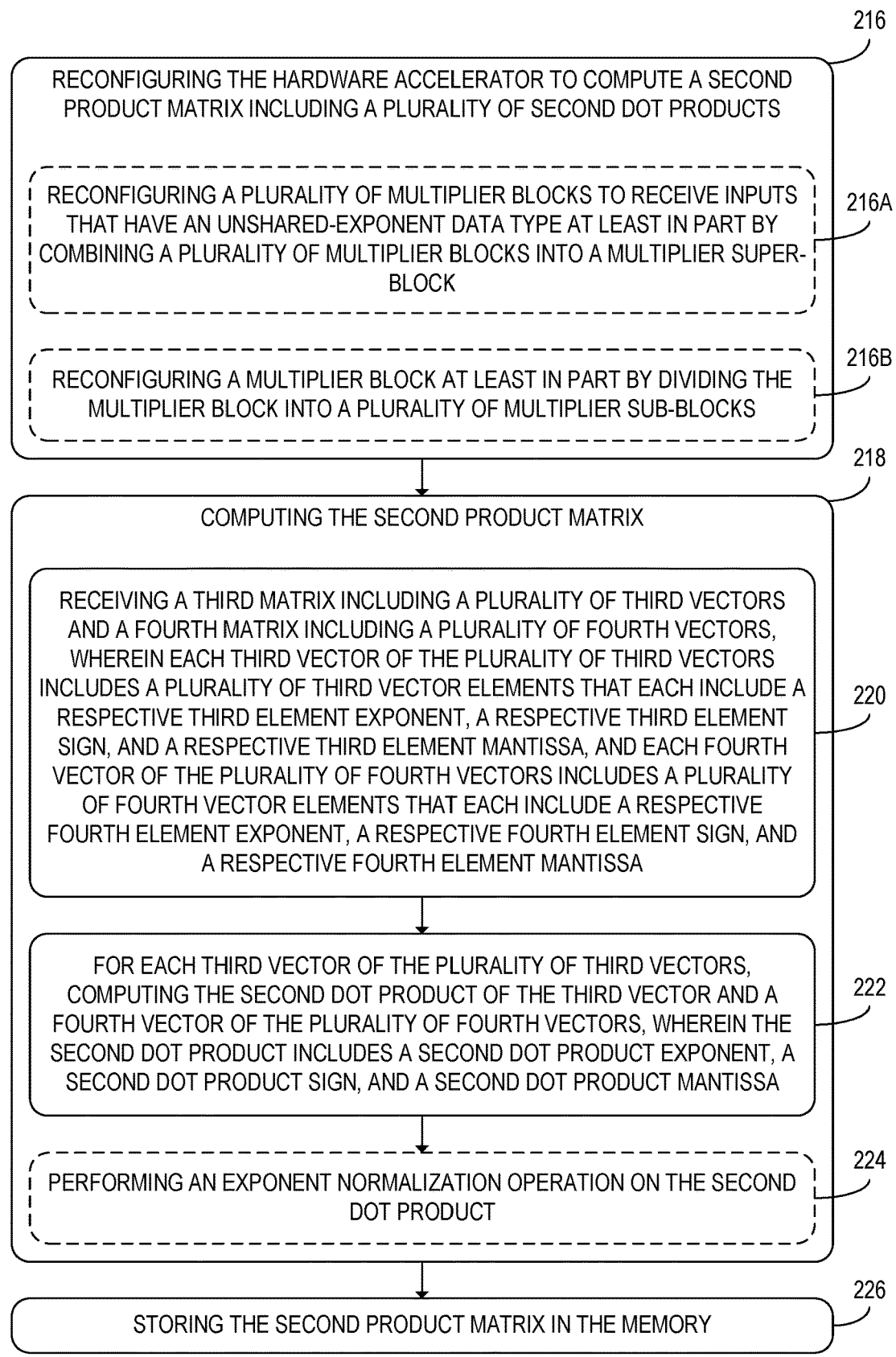

FIG. 8C shows additional steps of the method 200 that may be performed in some examples. At step 216, the method 200 may further include reconfiguring the hardware accelerator to compute a second product matrix including a second plurality of dot products. At step 218, the method 200 may further include computing the second product matrix at the reconfigured hardware accelerator.

Computing the second product matrix at step 218 may include, at step 220, receiving a third matrix including a plurality of third vectors and a fourth matrix including a plurality of fourth vectors. Each third vector of the plurality of third vectors may include a plurality of third vector elements that each include a respective third element exponent, a respective third element sign, and a respective third element mantissa. In addition, each fourth vector of the plurality of fourth vectors may include a plurality of fourth vector elements that each include a respective fourth element exponent, a respective fourth element sign, and a respective fourth element mantissa. Thus, the plurality of third vectors and the plurality of fourth vectors may each have an unshared-exponent data type, whereas the plurality of first vectors and the plurality of second vectors may each have a shared-exponent data type. The plurality of third vectors and the plurality of fourth vectors may be respectively received at the first input buffer and the second input buffer of the hardware accelerator.

At step 222, step 218 may further include, for each third vector of the plurality of third vectors, computing the second dot product of the third vector and a fourth vector of the plurality of fourth vectors. The second dot product may include a second dot product exponent, a second dot product sign, and a second dot product mantissa. In some examples, step 218 may further include, at step 224, performing an exponent normalization operation on the second dot product. The normalized second dot product may be included in the second product matrix. Alternatively, the normalized second dot product may be added to an additional dot product to obtain a dot product sum, and the exponent normalization operation may be performed again on the dot product sum. The normalized dot product sum may then be included in the second product matrix. At step 226, the method 200 may further include storing the second product matrix in the memory.

Each first vector element of the plurality of first vector elements and each second vector element of the plurality of second vector elements may include a respective mantissa having a first mantissa length. In addition, each third vector element of the plurality of third vector elements and each fourth vector element of the plurality of fourth vector elements may include a respective mantissa having a second mantissa length. The first mantissa length is different from the second mantissa length. Thus, when the hardware accelerator is reconfigured to receive inputs having the unshared-exponent data type, the hardware accelerator may also be reconfigured to receive inputs with a different mantissa length. In some examples, at step 216A, step 216 may include reconfiguring the plurality of multiplier blocks at least in part by combining the plurality of multiplier blocks into a multiplier super-block. For example, step 216A may be performed when the second mantissa length is an integer multiple of the first mantissa length. In other examples, at step 216B, step 216 may instead include reconfiguring a multiplier block at least in part by dividing the multiplier block into a plurality of multiplier sub-blocks. Step 216B may be performed when the first mantissa length is an integer multiple of the second mantissa length. In some examples, one or more bits may be added to each first element mantissa and each second element mantissa, or to each third element mantissa and each fourth element mantissa, such that the second mantissa length is an integer multiple of the first mantissa length or such that the first mantissa length is an integer multiple of the second mantissa length.

Using the devices and methods discussed above, matrix multiplication operations may be performed at a hardware accelerator when training a machine learning model. By using a shared-exponent data type to express the vectors included in the matrices for which a matrix multiplication operation is performed, the hardware accelerator may perform the matrix multiplication operation more quickly due to performing fewer exponent normalization operations. In addition, the multiplier blocks included in the hardware accelerator may be dynamically reconfigured to switch between receiving shared-exponent data and unshared-exponent data. By switching between shared-exponent data types and unshared-exponent data types, the multiplier blocks may compute dot products efficiently while still being able to compute the dot products with high precision when the elements of the input vectors have a wide range. Thus, when a machine learning model is trained using the hardware accelerator, values such as neuronal weights that are expressed in the form of matrices may be updated more efficiently.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
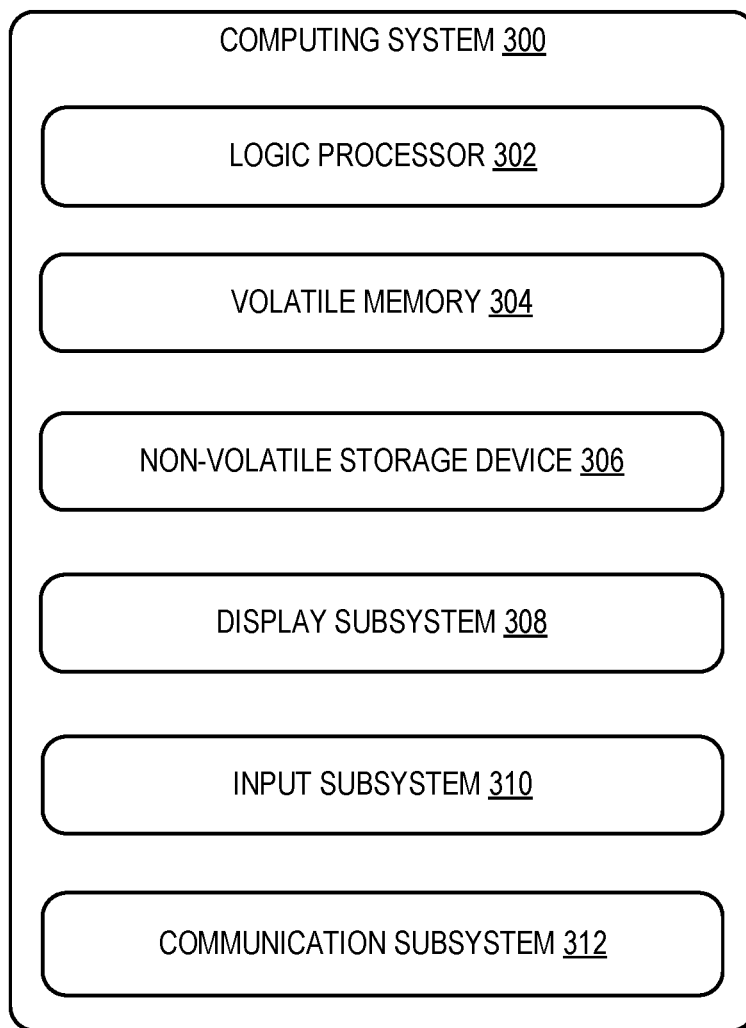
FIG. 9 shows a schematic view of an example computing environment in which the computing device of FIG. 1A may be enacted.

FIG. 9 schematically shows a non-limiting embodiment of a computing system 300 that can enact one or more of the methods and processes described above. Computing system 300 is shown in simplified form. Computing system 300 may embody the computing device 10 described above and illustrated in FIG. 1A. Components of the computing system 300 may be instantiated in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 9.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

The following paragraphs describe several aspects of the present disclosure. According to one aspect of the present disclosure, a computing device is provided, including a hardware accelerator configured to train a machine learning model at least in part by computing a first product matrix including a plurality of first dot products. Computing the first product matrix may include receiving a first matrix including a plurality of first vectors and a second matrix including a plurality of second vectors. Each first vector of the plurality of first vectors may include a first shared exponent and a plurality of first vector elements, and each second vector of the plurality of second vectors may include a second shared exponent and a plurality of second vector elements. For each first vector of the plurality of first vectors, computing the first product matrix may further include computing the first dot product of the first vector and a second vector of the plurality of second vectors. The first dot product may include a first dot product exponent, a first dot product sign, and a first dot product mantissa. The hardware accelerator may be further configured to train the machine learning model at least in part by storing the first product matrix in memory.

According to this aspect, each first vector element of the plurality of first vector elements may include a respective first element sign and a respective first element mantissa. Each second vector element of the plurality of second vector elements may include a respective second element sign and a respective second element mantissa.

According to this aspect, the hardware accelerator may be reconfigurable to compute a second product matrix including a plurality of second dot products at least in part by receiving a third matrix including a plurality of third vectors and a fourth matrix including a plurality of fourth vectors. Each third vector of the plurality of third vectors may include a plurality of third vector elements that each include a respective third element exponent, a respective third element sign, and a respective third element mantissa. Each fourth vector of the plurality of fourth vectors may include a plurality of fourth vector elements that each include a respective fourth element exponent, a respective fourth element sign, and a respective fourth element mantissa. Computing the second product matrix may further include, for each third vector of the plurality of third vectors, computing the second dot product of the third vector and a fourth vector of the plurality of fourth vectors. The second dot product may include a second dot product exponent, a second dot product sign, and a second dot product mantissa. Computing the second product matrix may further include storing the second product matrix in the memory.

According to this aspect, each first vector element of the plurality of first vector elements and each second vector element of the plurality of second vector elements may include a respective mantissa having a first mantissa length. Each third vector element of the plurality of third vector elements and each fourth vector element of the plurality of fourth vector elements may includes a respective mantissa having a second mantissa length. The first mantissa length may be different from the second mantissa length.

According to this aspect, the plurality of first dot products and the plurality of second dot products may be computed at a plurality of multiplier blocks included in the hardware accelerator. The second mantissa length may be an integer multiple of the first mantissa length. The hardware accelerator may be further configured to reconfigure the plurality of multiplier blocks to receive the plurality of third vectors and the plurality of fourth vectors at least in part by combining the plurality of multiplier blocks into a multiplier super-block at which the plurality of second dot products are computed.

According to this aspect, the plurality of first dot products and the plurality of second dot products may be computed at a multiplier block included in the hardware accelerator. The first mantissa length is an integer multiple of the second mantissa length. The hardware accelerator may be further configured to reconfigure the multiplier block to receive the plurality of third vectors and the plurality of fourth vectors at least in part by dividing the multiplier block into a plurality of multiplier sub-blocks at which the plurality of second dot products are computed.

According to this aspect, the hardware accelerator may include a plurality of pipeline stages that each include a corresponding matrix multiplier block. The hardware accelerator may be configured to compute a corresponding plurality of product matrices, including the first product matrix, at the matrix multiplier blocks of the plurality of pipeline stages.

According to this aspect, two or more pipeline stages of the plurality of pipeline stages are configured to receive respective inputs having different respective input types.

According to this aspect, the inputs received at the two or more pipeline stages may include respective input type metadata indicating the respective input types of the inputs.

According to this aspect, computing the first product matrix may further include performing an exponent normalization operation on the first dot product.

According to this aspect, computing the first product matrix may further include adding the first dot product to an additional dot product to obtain a dot product sum. Computing the first product matrix may further include performing the exponent normalization operation on the dot product sum.

According to another aspect of the present disclosure, a computing device is provided, including a hardware accelerator configured to train a machine learning model at least in part by computing a first product matrix. Computing the first product matrix may include configuring a multiplier block to receive inputs that have a shared-exponent data type. Computing the first product matrix may further include, at the multiplier block, receiving a first vector and a second vector that each have the shared-exponent data type. Computing the first product matrix may further include computing a first dot product of the first vector and the second vector. The hardware accelerator may be further configured to train the machine learning model at least in part by computing a second product matrix. Computing the second product matrix may include reconfiguring the multiplier block to receive inputs that have an unshared-exponent data type. Computing the second product matrix may further include receiving a third vector and a fourth vector that each have the unshared-exponent data type. Computing the second product matrix may further include computing a second dot product of the third vector and the fourth vector. The hardware accelerator may be further configured to train the machine learning model at least in part by storing the first product matrix and the second product matrix in memory.

According to this aspect, each first vector element of a plurality of first vector elements included in the first vector and each second vector element of a plurality of second vector elements included in the second vector may include a respective mantissa having a first mantissa length. Each third vector element of a plurality of third vector elements included in the third vector and each fourth vector element of a plurality of fourth vector elements included in the fourth vector may include a respective mantissa having a second mantissa length. The first mantissa length may be different from the second mantissa length.

According to this aspect, a plurality of first dot products and a plurality of second dot products may be computed at a plurality of multiplier blocks included in the hardware accelerator. The hardware accelerator may be configured to reconfigure the plurality of multiplier blocks to receive inputs that have the unshared-exponent data type at least in part by combining a plurality of multiplier blocks including the multiplier block into a multiplier super-block at which the second dot product is computed.

According to this aspect, when the multiplier block is reconfigured to receive inputs that have the unshared-exponent data type, the hardware accelerator may be further configured to reconfigure the multiplier block at least in part by dividing the multiplier block into a plurality of multiplier sub-blocks at which the second dot product is computed.

According to this aspect, computing the first product matrix and the second product matrix may further include performing an exponent normalization operation on the first dot product and the second dot product.

According to this aspect, the hardware accelerator may be further configured to perform the exponent normalization operation on a plurality of intermediate products of third vector elements of the third vector and fourth vector elements of the fourth vector when computing the second dot product.

According to another aspect of the present disclosure, a method for use with a computing device is provided. The method may include, at a hardware accelerator, training a machine learning model at least in part by computing a first product matrix including a plurality of first dot products. Computing the first product matrix may include receiving a first matrix including a plurality of first vectors and a second matrix including a plurality of second vectors. Each first vector of the plurality of first vectors may include a first shared exponent and a plurality of first vector elements, and each second vector of the plurality of second vectors may include a second shared exponent and a plurality of second vector elements. For each first vector of the plurality of first vectors, computing the first product matrix may further include computing the first dot product of the first vector and a second vector of the plurality of second vectors. The first dot product may include a first dot product exponent, a first dot product sign, and a first dot product mantissa. Training the machine learning model may further include storing the first product matrix in memory.

According to this aspect, the method may further include reconfiguring the hardware accelerator to compute a second product matrix including a plurality of second dot products at least in part by receiving a third matrix including a plurality of third vectors and a fourth matrix including a plurality of fourth vectors. Each third vector of the plurality of third vectors may include a plurality of third vector elements that each include a respective third element exponent, a respective third element sign, and a respective third element mantissa. Each fourth vector of the plurality of fourth vectors may include a plurality of fourth vector elements that each include a respective fourth element exponent, a respective fourth element sign, and a respective fourth element mantissa. Computing the second product matrix may further include, for each third vector of the plurality of third vectors, computing the second dot product of the third vector and a fourth vector of the plurality of fourth vectors. The second dot product may include a second dot product exponent, a second dot product sign, and a second dot product mantissa. Computing the second product matrix may further include storing the second product matrix in the memory.

According to this aspect, computing the first product matrix further includes performing an exponent normalization operation on the first dot product.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a hardware accelerator configured to train a machine learning model at least in part by:
computing a first product matrix including a plurality of first dot products, wherein computing the first product matrix includes:
receiving a first matrix including a plurality of first vectors and a second matrix including a plurality of second vectors, wherein:
each first vector of the plurality of first vectors includes a first shared exponent and a plurality of first vector elements; and
each second vector of the plurality of second vectors includes a second shared exponent and a plurality of second vector elements; and
for each first vector of the plurality of first vectors, computing the first dot product of the first vector and a second vector of the plurality of second vectors, wherein the first dot product includes a first dot product exponent, a first dot product sign, and a first dot product mantissa; and
storing the first product matrix in memory, wherein:
the hardware accelerator includes a plurality of pipeline stages that each include a corresponding multiplier block;
the hardware accelerator is configured to compute a corresponding plurality of product matrices, including the first product matrix, at the multiplier blocks of the plurality of pipeline stages; and
when computing the product matrices, two or more pipeline stages of the plurality of pipeline stages are configured to perform respective matrix multiplication operations on input matrices that have a shared-exponent data type and on input matrices that have an unshared-exponent data type.

2. The computing device of claim 1, wherein:
each first vector element of the plurality of first vector elements includes a respective first element sign and a respective first element mantissa; and
each second vector element of the plurality of second vector elements includes a respective second element sign and a respective second element mantissa.

3. The computing device of claim 1, wherein the hardware accelerator is reconfigurable to compute a second product matrix including a plurality of second dot products at least in part by:
receiving a third matrix including a plurality of third vectors and a fourth matrix including a plurality of fourth vectors, wherein:
each third vector of the plurality of third vectors includes a plurality of third vector elements that each include a respective third element exponent, a respective third element sign, and a respective third element mantissa; and
each fourth vector of the plurality of fourth vectors includes a plurality of fourth vector elements that each include a respective fourth element exponent, a respective fourth element sign, and a respective fourth element mantissa;
for each third vector of the plurality of third vectors, computing the second dot product of the third vector and a fourth vector of the plurality of fourth vectors, wherein the second dot product includes a second dot product exponent, a second dot product sign, and a second dot product mantissa; and
storing the second product matrix in the memory.

4. The computing device of claim 3, wherein:
each first vector element of the plurality of first vector elements and each second vector element of the plurality of second vector elements includes a respective mantissa having a first mantissa length; and
each third vector element of the plurality of third vector elements and each fourth vector element of the plurality of fourth vector elements includes a respective mantissa having a second mantissa length, wherein the first mantissa length is different from the second mantissa length.

5. The computing device of claim 4, wherein:
the plurality of first dot products and the plurality of second dot products are computed at two or more of the multiplier blocks included in the hardware accelerator;
the second mantissa length is an integer multiple of the first mantissa length; and
the hardware accelerator is further configured to reconfigure the plurality of multiplier blocks to receive the plurality of third vectors and the plurality of fourth vectors at least in part by combining the plurality of multiplier blocks into a multiplier super-block at which the plurality of second dot products are computed.

6. The computing device of claim 4, wherein:
the plurality of first dot products and the plurality of second dot products are computed at a multiplier block of the plurality of multiplier blocks included in the hardware accelerator;
the first mantissa length is an integer multiple of the second mantissa length; and
the hardware accelerator is further configured to reconfigure the multiplier block to receive the plurality of third vectors and the plurality of fourth vectors at least in part by dividing the multiplier block into a plurality of multiplier sub-blocks at which the plurality of second dot products are computed.

7. The computing device of claim 1, wherein the inputs received at the two or more pipeline stages include respective input type metadata indicating the respective input types of the inputs.

8. The computing device of claim 1, wherein computing the first product matrix further includes performing an exponent normalization operation on the first dot product.

9. The computing device of claim 8, wherein computing the first product matrix further includes:
adding the first dot product to an additional dot product to obtain a dot product sum; and
performing the exponent normalization operation on the dot product sum.

10. A computing device comprising:
a hardware accelerator configured to train a machine learning model at least in part by:

computing a first product matrix, wherein computing the first product matrix includes:
configuring a multiplier block to receive inputs that have a shared-exponent data type;
at the multiplier block, receiving a first vector and a second vector that each have the shared-exponent data type;
computing a first dot product of the first vector and the second vector;
computing a second product matrix, wherein computing the second product matrix includes:
reconfiguring the multiplier block to receive inputs that have an unshared-exponent data type;
receiving a third vector and a fourth vector that each have the unshared-exponent data type; and
computing a second dot product of the third vector and the fourth vector; and
storing the first product matrix and the second product matrix in memory, wherein:
the hardware accelerator includes a plurality of pipeline stages;
the multiplier block is included in a pipeline stage of the plurality of pipeline stages; and
two or more pipeline stages of the plurality of pipeline stages are configured to perform respective matrix multiplication operations on input matrices that have the shared-exponent data type and on input matrices that have the unshared-exponent data type.

11. The computing device of claim 10, wherein:
each first vector element of a plurality of first vector elements included in the first vector and each second vector element of a plurality of second vector elements included in the second vector includes a respective mantissa having a first mantissa length; and
each third vector element of a plurality of third vector elements included in the third vector and each fourth vector element of a plurality of fourth vector elements included in the fourth vector includes a respective mantissa having a second mantissa length, wherein the first mantissa length is different from the second mantissa length.

12. The computing device of claim 11, wherein:
a plurality of first dot products and a plurality of second dot products are computed at a plurality of multiplier blocks included in the hardware accelerator; and
the hardware accelerator is configured to reconfigure the plurality of multiplier blocks to receive inputs that have the unshared-exponent data type at least in part by combining a plurality of multiplier blocks including the multiplier block into a multiplier super-block at which the second dot product is computed.

13. The computing device of claim 11, wherein, when the multiplier block is reconfigured to receive inputs that have the unshared-exponent data type, the hardware accelerator is further configured to reconfigure the multiplier block at least in part by dividing the multiplier block into a plurality of multiplier sub-blocks at which the second dot product is computed.

14. The computing device of claim 10, wherein computing the first product matrix and the second product matrix further includes performing an exponent normalization operation on the first dot product and the second dot product.

15. The computing device of claim 14, wherein the hardware accelerator is further configured to perform the exponent normalization operation on a plurality of intermediate products of third vector elements of the third vector and fourth vector elements of the fourth vector when computing the second dot product.

16. A method for use with a computing device, the method comprising:
at a hardware accelerator, training a machine learning model at least in part by:
computing a first product matrix including a plurality of first dot products, wherein computing the first product matrix includes:
receiving a first matrix including a plurality of first vectors and a second matrix including a plurality of second vectors, wherein:
each first vector of the plurality of first vectors includes a first shared exponent and a plurality of first vector elements; and
each second vector of the plurality of second vectors includes a second shared exponent and a plurality of second vector elements; and
for each first vector of the plurality of first vectors, computing the first dot product of the first vector and a second vector of the plurality of second vectors, wherein the first dot product includes a first dot product exponent, a first dot product sign, and a first dot product mantissa; and
storing the first product matrix in memory, wherein:
the hardware accelerator includes a plurality of pipeline stages that each include a corresponding multiplier block;
the method further comprises computing a corresponding plurality of product matrices, including the first product matrix, at the multiplier blocks of the plurality of pipeline stages; and
when computing the product matrices, at two or more pipeline stages of the plurality of pipeline stages, the method further comprises performing respective matrix multiplication operations on input matrices that have a shared-exponent data type and on input matrices that have an unshared-exponent data type.

17. The method of claim 16, further comprising reconfiguring the hardware accelerator to compute a second product matrix including a plurality of second dot products at least in part by:
receiving a third matrix including a plurality of third vectors and a fourth matrix including a plurality of fourth vectors, wherein:
each third vector of the plurality of third vectors includes a plurality of third vector elements that each include a respective third element exponent, a respective third element sign, and a respective third element mantissa; and
each fourth vector of the plurality of fourth vectors includes a plurality of fourth vector elements that each include a respective fourth element exponent, a respective fourth element sign, and a respective fourth element mantissa;
for each third vector of the plurality of third vectors, computing the second dot product of the third vector and a fourth vector of the plurality of fourth vectors, wherein the second dot product includes a second dot product exponent, a second dot product sign, and a second dot product mantissa; and
storing the second product matrix in the memory.

18. The method of claim 16, wherein computing the first product matrix further includes performing an exponent normalization operation on the first dot product.

* * * * *